United States Patent [19]
Watkins et al.

[11] Patent Number: 5,200,278
[45] Date of Patent: Apr. 6, 1993

[54] INTEGRATED FUEL CELL POWER GENERATION SYSTEM

[75] Inventors: David S. Watkins, Coquitlam; Kenneth W. Dircks, North Vancouver; Danny G. Epp, Tsawwassen; Robert D. Merritt, Brian N. Gorbell, both of Vancouver, all of Canada

[73] Assignee: Ballard Power Systems, Inc., North Vancouver, Canada

[21] Appl. No.: 670,245

[22] Filed: Mar. 15, 1991

[51] Int. Cl.⁵ .............................................. H01M 8/06
[52] U.S. Cl. ...................................... 429/24; 429/26; 429/34
[58] Field of Search .................. 429/24, 26, 34, 40, 429/17, 19, 20, 13

[56] References Cited

U.S. PATENT DOCUMENTS 3,134,697  3/1964  Niedrach .
3,297,484  1/1967  Niedrach .
4,973,530  11/1990  Vanderborgh et al. .............. 429/13
4,988,583  1/1991  Watkins et al. .

FOREIGN PATENT DOCUMENTS

2139110  11/1984  United Kingdom .

Primary Examiner—Anthony Skapars
Attorney, Agent, or Firm—McAndrews, Held & Malloy, Ltd.

[57] ABSTRACT

An integrated fuel cell power generation system comprises a fuel cell stack having a humidification section and an electrochemically active section. The humidification section imparts water vapor to an inlet hydrogen containing fuel stream and an inlet oxygen containing oxidant stream. The electrochemically active section comprises fuel cells for promoting the electrocatalytic conversion of the humidified fuel and oxidant streams to electric current and product water. The electrochemically active section also includes a coolant water stream for absorbing heat generated in the active section. The system includes a heat exchanger for removing heat from the coolant water stream exiting the active section, a water separator for removing water from the oxidant stream exiting the fuel cell stack, and a coolant reservoir for receiving the removed water stream from the water separator and from the heat exchanger. The coolant water stream is drawn from the coolant reservoir.

20 Claims, 7 Drawing Sheets

INTEGRATED FUEL CELL POWER GENERATION SYSTEM

FIELD OF THE INVENTION

The present invention relates to electrochemical fuel cells. More particularly, the present invention relates to a fuel cell based electric power generation system having integrated fuel, oxidant and coolant circuits.

BACKGROUND OF THE INVENTION

Electrochemical fuel cells generate electrical energy by converting chemical energy derived from a fuel directly into electrical energy by the oxidation of the fuel in the cell. A typical fuel cell includes an anode, a cathode and an electrolyte. Fuel and oxidant are supplied to the anode and cathode, respectively. At the anode, the fuel permeates the electrode material and reacts at the anode catalyst layer to form cations, which migrate through the electrolyte to the cathode. At the cathode, the oxygen containing gas supply reacts at the cathode catalyst layer to form anions. The anions formed at the cathode react with the cations to form a reaction product. The fuel cell generates a useable electric current and the reaction product is removed from the cell.

In electrochemical fuel cells employing hydrogen as the fuel and oxygen containing air (or pure oxygen) as the oxidant, a catalyzed reaction at the anode produces hydrogen cations from the fuel supply. An ion exchange membrane facilitates the migration of hydrogen ions (protons) from the anode to the cathode. In addition to conducting hydrogen cations, the membrane isolates the hydrogen fuel stream from the oxidant stream comprising oxygen containing air. At the cathode, oxygen reacts at the catalyst layer to form anions. The anions formed at the cathode react with the hydrogen ions that have crossed the membrane to form liquid water as the reaction product.

The anode and cathode reactions in such fuel cells is shown in equations (1) and (2) below:

Solid polymer fuel cells generally contain a membrane electrode assembly ("MEA") consisting of a solid polymer electrolyte or ion exchange membrane disposed between two electrodes formed of porous, electrically conductive sheet material. The electrodes are typically formed of carbon fiber paper, and are generally impregnated or coated with a hydrophobic polymer, such as polytetrafluoroethylene. The MEA contains a layer of catalyst at each membrane/electrode interface to induce the desired electrochemical reaction. A finely divided platinum catalyst is typically employed. The MEA is in turn disposed between two electrically conductive plates, each of which has at least one flow passage engraved or milled therein. These fluid flow field plates are typically formed of graphite The flow passages direct the fuel and oxidant to the respective electrodes, namely, the anode on the fuel side and the cathode on the oxidant side. The electrodes are electrically coupled to provide a path for conducting electrons between the electrodes.

In a single cell arrangement, fluid flow field plates are provided on each of the anode and cathode sides. The plates act as current collectors, provide support for the electrodes, provide access channels for the fuel and oxidant to the respective anode and cathode surfaces, and provide channels for the removal of water formed during operation of the cell.

Two or more fuel cells can be connected together in series or in parallel to increase the overall power output of the assembly. In such arrangements, the cells are typically connected in series, wherein one side of a given plate serves as an anode plate for one cell and the other side of the plate is the cathode plate for the adjacent cell. Such a series connected multiple fuel cell arrangement is referred to as a fuel cell stack, and is usually held together by tie rods and end plates. The stack typically includes feed manifolds or inlets for directing the fuel (substantially pure hydrogen, methanol reformate or natural gas reformate) and the oxidant (substantially pure oxygen or oxygen containing air) to the anode and cathode flow field channels. The stack also usually includes a feed manifold or inlet for directing the coolant fluid, typically water, to interior channels within the stack to absorb heat generated by the exothermic reaction of hydrogen and oxygen within the fuel cells. The stack also generally includes exhaust manifolds or outlets for expelling the unreacted fuel and oxidant gases, each carrying entrained water, as well as an outlet manifold for the coolant water exiting the stack.

Perfluorosulfonic ion exchange membranes, such as those sold by DuPont under its Nafion trade designation, must be hydrated or saturated with water molecules for ion transport to occur. It is generally believed that such perfluorosulfonic membranes transport cations using a "water pumping" mechanism. Water pumping involves the transport of cations in conjunction with water molecules, resulting in a net flow of water from the anode side of the membrane to the cathode side. Thus, membranes exhibiting the water pumping mechanism can dry out, especially on the anode side, if water transported along with hydrogen ions is not replenished. Such replenishment typically occurs by humidifying the hydrogen containing fuel stream prior to introducing the fuel stream into the cell. Similarly, the oxygen containing oxidant stream is typically humidified prior to introducing the oxidant stream into the fuel cell to prevent the membrane from drying out on the cathode side.

A new type of experimental perfluorosulfonic ion exchange membrane, sold by Dow under the trade designation XUS13204.10, does not appear to significantly exhibit the water pumping mechanism in connection with the transport of hydrogenions across the membrane. Thus, the transport of water molecules across the Dow experimental membranes does not appear to be necessary for the transport of hydrogen ions as in the Nafion type membranes. Despite the apparent absence of water pumping, however, the Dow experimental membranes still appear to require hydration to effect hydrogen ion transport.

In fuel cells employing hydrogen as the fuel and oxygen as the oxidant, the fuel can be supplied in the form of substantially pure hydrogen or as a hydrogen containing reformate as, for example, the product of the reformation of methanol and water or reformation of natural gas. Similarly, the oxidant can be supplied in the form of substantially pure oxygen or oxygen containing air. The fuel cells are typically flooded with fuel and oxidant at constant pressure. Pressure is generally controlled by a pressure regulator at the source of the reactant. When an electrical load is placed on the circuit connecting the electrodes, fuel and oxidant are consumed in direct proportion to the electrical current drawn by the load.

When using substantially pure reactants, the unconsumed reactants exiting the fuel cell stack are recirculated to minimize waste. Water in the gas streams exiting the fuel cells is accumulated in a separator or knockout drum, where the water can be recirculated and used as a coolant or drained from the system. The fuel stream exiting the stack generally contains water from the humidification of the fuel stream prior to its introduction into the fuel cell stack. The oxidant stream exiting the stack generally contains product water generated at the cathodes of the fuel cells in addition to the water from the humidification of the oxidant stream. After removal of water from the stream, the stream is recirculated and merged with the source gas stream prior to the inlet of the fuel cell stack. The flow rate of recirculated gas is usually controlled by a compressor.

When using dilute reactants, such as reformate or air, the unconsumed reactant streams exiting the fuel cell stack are generally not recirculated. However, water in such dilute gas streams is generally removed in a separator or knockout drum and then drained. The partially depleted reactant streams are generally vented to the atmosphere.

As discussed above, hydrogen ion conductivity through ion exchange membranes generally requires the presence of water molecules. The fuel and oxidant gases are therefore humidified prior to introducing them to the cell to maintain the saturation of the membranes within the MEAs. Ordinarily, the fuel and oxidant gases are humidified by flowing each gas on one side of a water vapor exchange membrane and by flowing deionized water on the opposite side of the membrane. Deionized water is preferred to prevent membrane contamination by undesired ions. In such membrane based humidification arrangements, water is osmotically transferred across the membrane to the fuel and oxidant gases. Nafion is a suitable and convenient humidification membrane material in such applications, but other commercially available water exchange membranes are suitable as well. Other nonmembrane based humidification techniques could be employed, such as exposing the gases directly to water in an evaporation chamber to permit the gas to absorb evaporated water.

It is generally preferred to humidify the fuel and oxidant gases at, or as close as possible to, the operating temperature and pressure of the fuel cell. The ability of gases such as air to absorb water vapor varies significantly with changes in temperature, especially at low operating pressures. Humidification of the air (oxidant) stream at a temperature significantly below fuel cell operating temperature could ultimately dehydrate the membrane. Consequently, it is preferable to integrate the humidification function with the active portion of the fuel cell stack, and to condition the fuel and oxidant streams to nearly the same temperature and pressure as the active section of the stack. In such an integrated arrangement, the coolant water stream from the active section, which is at or near the cell operating temperature, is used as the humidification water stream. Similarly, the fuel and oxidant streams are typically directed via manifolds or headers through the active section to condition each to cell temperature prior to introducing them to the humidification section.

In addition to integrating the coolant water stream of the active section with the humidification water stream of the humidification section, it is also advantageous to integrate the fuel cell product water stream with the coolant stream, and thereby use the product water generated electrochemically in the fuel cell stack to regulate the temperature of the stack. In this regard, the use of product water as the coolant avoids the need to provide a separate external source of coolant fluid, since the water generated by the cell is itself a suitable coolant fluid. The use of product water as the coolant fluid is also advantageous during start up, when the relatively warm product water stream can be used to rapidly bring the active section up to operating temperature.

OBJECTS OF THE INVENTION

It is therefore an object of the invention to provide an integrated fuel cell based electric power generation system in which the electrochemically active section is integrated with the humidification section in the same fuel cell stack assembly.

It is another object of the invention to provide an integrated fuel cell based electric power generation system in which the product water removed from the fuel cell stack provides the coolant fluid for the electrochemically active section.

It is still another object of the invention to provide an integrated fuel cell based electric power generation system in which the product water removed from the fuel cell stack provides the humidification water stream for the humidification section.

SUMMARY OF THE INVENTION

The above and other objects are achieved by providing an electric power generation system comprising a fuel cell stack having a humidification section and an electrochemically active section. The humidification section comprises at least one fuel humidification assembly comprising a fuel humidification water stream, an inlet hydrogen containing fuel stream and a water vapor transport membrane interposed therebetween for transporting water vapor from the fuel humidification water stream to the inlet fuel stream to produce a humidified fuel stream. The humidification section further comprises at least one oxidant humidification assembly comprising an oxidant humidification water stream, an inlet oxygen containing oxidant stream and a water vapor transport membrane interposed therebetween for transporting water vapor from the oxidant humidification water stream to the inlet oxidant stream to produce a humidified oxidant stream.

The electrochemically active section comprises at least one fuel cell. Each fuel cell comprises:

an anode having a catalyst associated therewith for producing cations from the humidified fuel stream, a cathode having a catalyst associated therewith for producing anions from the humidified oxidant stream, the anions reacting with the cations to form water at the cathode, an ion exchange membrane interposed between the anode and the cathode, the membrane facilitating the migration of cations from the anode to the cathode and isolating the humidified fuel stream from the humidified oxidant stream, and an electrical path for conducting the electrons formed at the anode to the cathode.

The electrochemically active section further comprises at least one inlet coolant water stream for absorbing heat generated within the electrochemically active section to produce an outlet coolant water stream.

The integrated fuel cell power generation system further comprises:

a heat exchanger for removing heat from the outlet coolant water stream to produce a chilled coolant water stream, a water separator for removing water from the humidified oxidant stream to produce a dehumidified oxidant stream and a removed water stream, and a coolant reservoir for receiving the removed water stream from the water separator and the chilled coolant water stream from the heat exchanger.

The inlet coolant water stream is drawn from the coolant reservoir.

The fuel cell power generation system preferably further comprises a second water separator for removing water from the humidified fuel stream to produce a dehumidified fuel stream. The dehumidified fuel stream is recirculated to the inlet fuel stream. A purge valve is preferably included for venting the dehumidified fuel stream to the atmosphere to expel contaminants accumulated within the dehumidified fuel stream.

In fuel cell power generation systems employing a substantially pure oxidant supply, the dehumidified oxidant stream is recirculated to the inlet oxidant supply. A purge valve is preferably included in such systems for venting the dehumidified oxidant stream to the atmosphere to expel contaminants accumulated within the dehumidified oxidant stream.

In a preferred fuel cell power generation system, the outlet coolant water stream supplies both the fuel humidification water stream and the oxidant humidification water stream. Most preferably, the fuel humidification water stream and the oxidant humidification water stream are integrated.

In another preferred fuel cell power generation system, the water separator and the coolant reservoir are integral. The water within the reservoir promotes the condensation of water from the humidified oxidant stream.

In yet another preferred fuel cell power generation system, the heat exchanger comprises heat exchange surfaces and air circulation means directed toward the surfaces. The system further comprises control means for actuating the air circulation means when the temperature of the humidified oxidant stream exiting the fuel cell stack exceeds a predetermined value.

In still another preferred fuel cell power generation system, the heat exchanger further comprises valve means for diverting the outlet coolant water stream to the chilled coolant water stream substantially without removing heat therefrom. The preferred heat exchanger further comprises control means for actuating the valve means when the temperature of the humidified oxidant stream exiting the fuel cell stack is below a predetermined value.

DETAILED DESCRIPTION OF THE DRAWINGS

Figure 1:
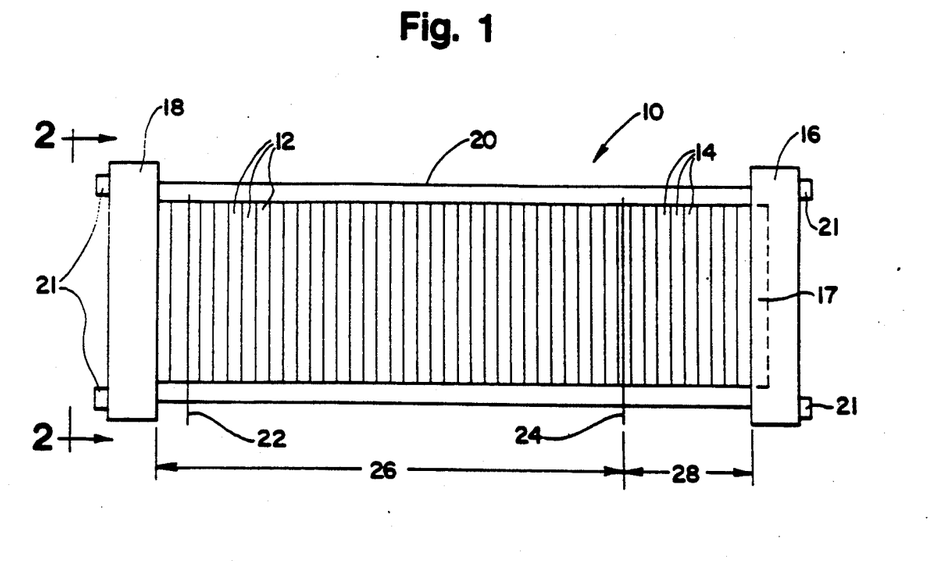
FIG. 1 is a side elevation view of a fuel cell stack showing the electrochemically active and humidification sections.

Turning first to FIG. 1 of the drawings, a fuel cell stack assembly 10 includes an electrochemically active section 26 and a humidification section 28. Stack assembly 10 is a modular plate and frame design, and includes a compression end plate 16 and a fluid end plate 18. An optional pneumatic piston 17, positioned within compression end plate 16, applies uniform pressure to the assembly to promote sealing. Bus plates 22 and 24 located on opposite ends of active section 26 provide the negative and positive contacts, respectively, to draw current generated by the assembly to a load (not shown). Tie rods 20 extend between end plates 16 and 18 to retain and secure stack assembly 10 in its assembled state with fastening nuts 21.

Active section 26 includes, in addition to bus plates 22 and 24, a plurality of fuel cell assemblies 12, each assembly 12 consisting of two oppositely configured fuel cells, as described in more detail below. Humidification section 28 includes a plurality of humidification assemblies 14, each assembly 14 consisting of a fuel or oxidant reactant flow field plate, a water flow field plate and a water vapor transport membrane interposed between the reactant flow field plate and the water flow field plate. Humidification section 28 imparts water vapor to the fuel and oxidant streams that are later fed to active section 26, thereby preventing the membranes within the active section from drying out.

Figure 2:
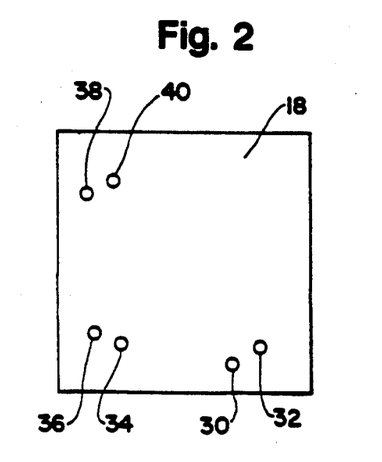
FIG. 2 is an end view of the fuel cell stack, taken in the direction of arrows 2—2 of FIG. 1.

FIG. 2 is an end view of fluid end plate 18 of stack assembly 10 illustrated in FIG. 1. As shown in FIG. 2, fluid end plate 18 includes fuel inlet 30, fuel outlet 32, oxidant inlet 34, oxidant outlet 36, water inlet 38, and water outlet 40. For purposes of clarity, the fastening nuts 21 at the ends of tie rods 20 (see FIG. 1) are not shown in FIG. 2.

Figure 3:
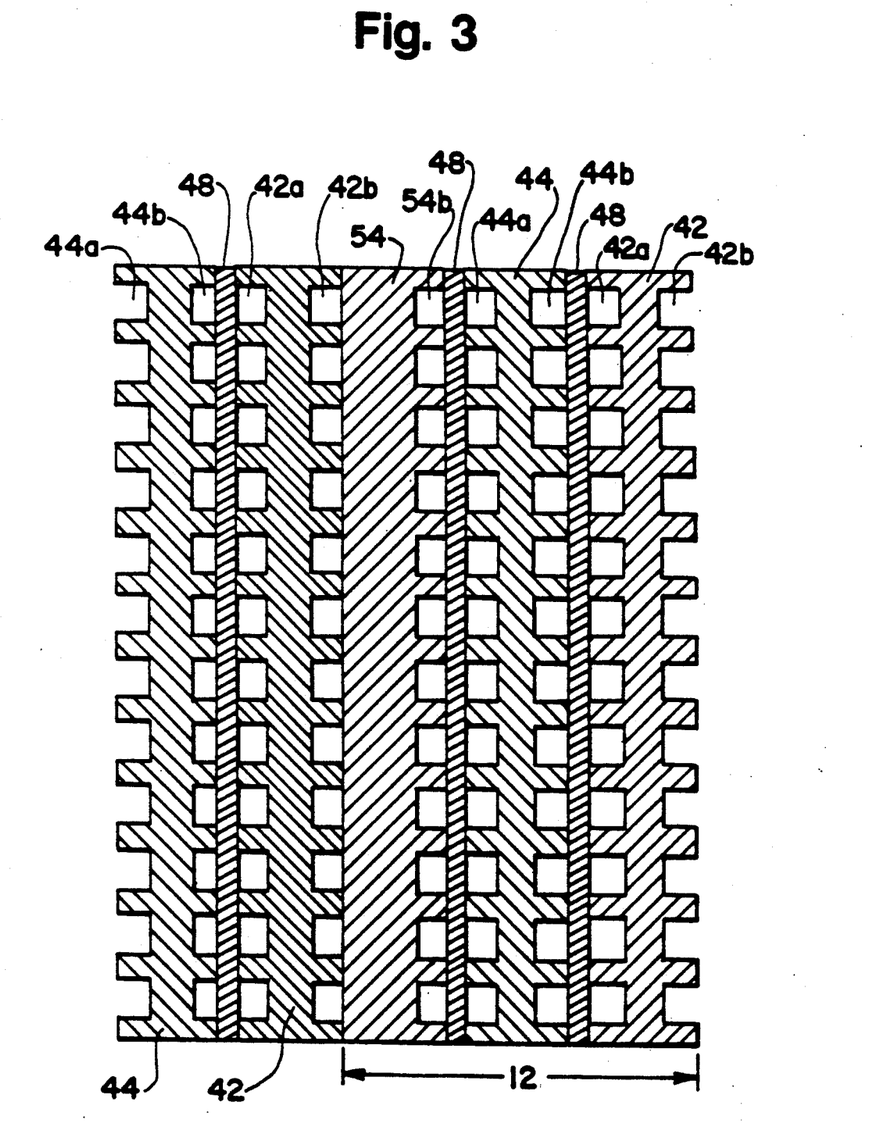
FIG. 3 is a sectional view of a electrochemically active section of the fuel of FIG. 1.

FIG. 3 is a sectional view of the fuel cell assemblies 12 which constitute the electrochemically active section of fuel cell stack 10 of FIG. 1. As shown figured fuel cells. In particular, assembly 12 includes graphite flow field plates 42, 44 and 54. Fuel flow field channels 44a and 44b are engraved or milled into opposite sides of plate 44. Oxidant flow field channels 42a and 54b are engraved or milled into plates 42 and 54, respectively, as shown. Water flow field channels 42b are engraved or milled into plate 42 on the side opposite channels 42a, as shown. Membrane electrode assemblies 48 are interposed between fuel flow field channels 44b and oxidant flow field channels 42a and between fuel flow field channels 44a and oxidant flow field channels 54b.

Membrane electrode assemblies 48 are essentially identical. Each membrane electrode assembly 48 comprises two layers of porous electrically conductive sheet material, preferably carbon fiber paper, and a solid polymer electrolyte or ion exchange membrane interposed between the two layers of porous electrically conductive sheet material. The sheet material layers are each coated with catalyst, preferably finely divided platinum, on the surfaces adjacent and in contact with the ion exchange membrane to render the sheet material electrochemically active. The two electrodes and ion exchange membrane are heat and pressure consolidated to form membrane electrode assemblies 48.

Figure 4:
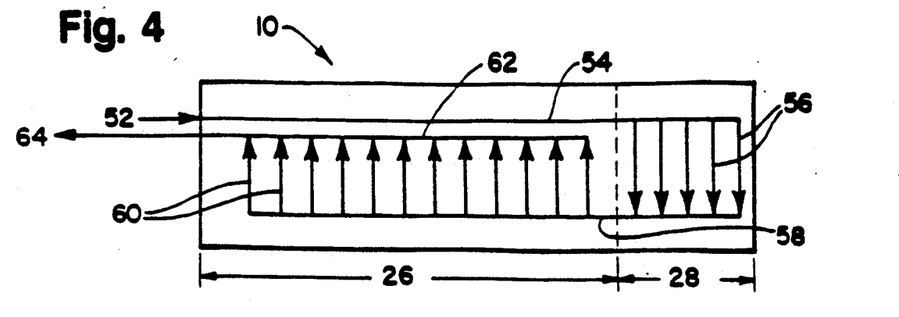
FIG. 4 is a schematic flow diagram of the fuel stream through the fuel cell stack of FIG. 1.

FIG. 4 is a schematic flow diagram of the fuel stream through the active section 26 and the humidification section 28 of fuel cell stack 10. Fuel inlet stream 52 enters fuel cell stack 10 and traverses the extent of active section 26 within fuel inlet manifold 54 to bring the fuel stream up to or near cell operating temperature. From inlet manifold 54, the fuel stream passes through the fuel channels 56 within humidification section 28. Water vapor exchange membranes (not shown) separate fuel channels 56 from the humidification water stream (not shown in FIG. 4). Humidified fuel manifold 58 directs the humidified fuel stream exiting channels 56 to active section 26, where the humidified fuel stream passes through the fuel flow field channels 60 of the fuel cells to participate in the electrocatalytic oxidation of the fuel to water and electric power. Fuel outlet manifold 62 directs the unreacted fuel stream exiting channels 60 to produce a fuel outlet stream 64.

Figure 5:
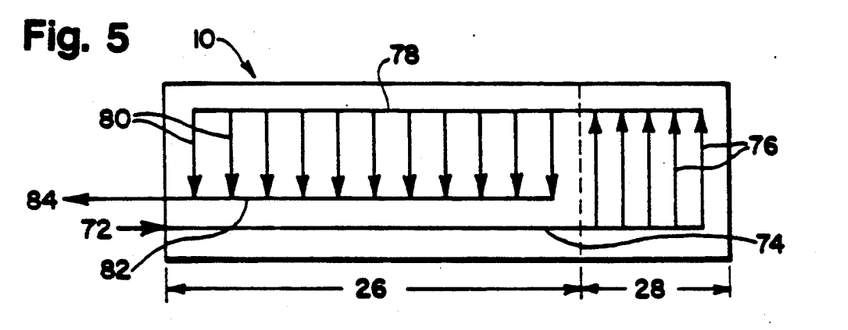
FIG. 5 is a schematic flow diagram of the oxidant stream through the fuel cell stack of FIG. 1.

FIG. 5 is a schematic flow diagram of the oxidant stream through the active section 26 and the humidification section 28 of fuel cell stack 10. Oxidant inlet stream 72 enters fuel cell stack 10 and traverses the extent of active section 26 within oxidant inlet manifold 74 to bring the oxidant stream up to or near cell operating temperature. From oxidant inlet manifold 74, the fuel stream passes through the oxidant channels 76 within humidification section 28. Water vapor exchange membranes (not shown) separate oxidant channels 76 from the humidification water stream (not shown in FIG. 4). Humidified oxidant manifold 78 directs the humidified oxidant stream exiting channels 76 to active section 26, where the humidified oxidant stream passes through the oxidant flow field channels 80 of the fuel cells to participate in the electrochemical reaction with the fuel. Oxidant outlet manifold 82 directs the unreacted oxidant stream exiting channels 80 to produce an oxidant outlet stream 84.

Figure 6:
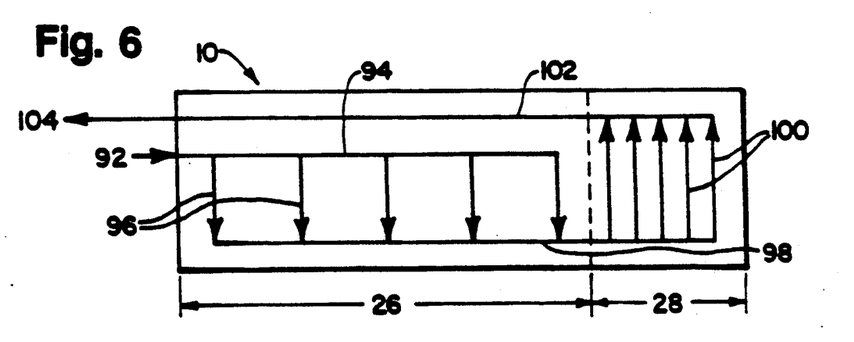
FIG. 6 is a schematic flow diagram of the combined coolant water stream and humidification water stream of the fuel cell stack of FIG. 1.

FIG. 6 is a schematic flow diagram of the combined coolant water stream and humidification water stream through the active section 26 and humidification section 28, respectively, of fuel cell stack 10. Water inlet stream 92 enters fuel cell stack 10 and is directed through water inlet manifold 94 to coolant water channels 96 within active section 26. The water stream within coolant channels 96 absorbs heat generated in active section 26 by the exothermic reaction of the fuel and the oxidant. Water manifold 98 directs the water stream exiting coolant channels 96 from active section 26 to humidification section 28. From water manifold 98, the water stream, at approximately cell operating temperature, passes through the humidification water channels 100 within humidification section 28 to impart water vapor to the fuel and oxidant streams (not shown) on the opposite sides of the water vapor exchange membranes (not shown). Water outlet manifold 102 directs the humidification water stream exiting channels 100 to water outlet 104.

Figure 7:
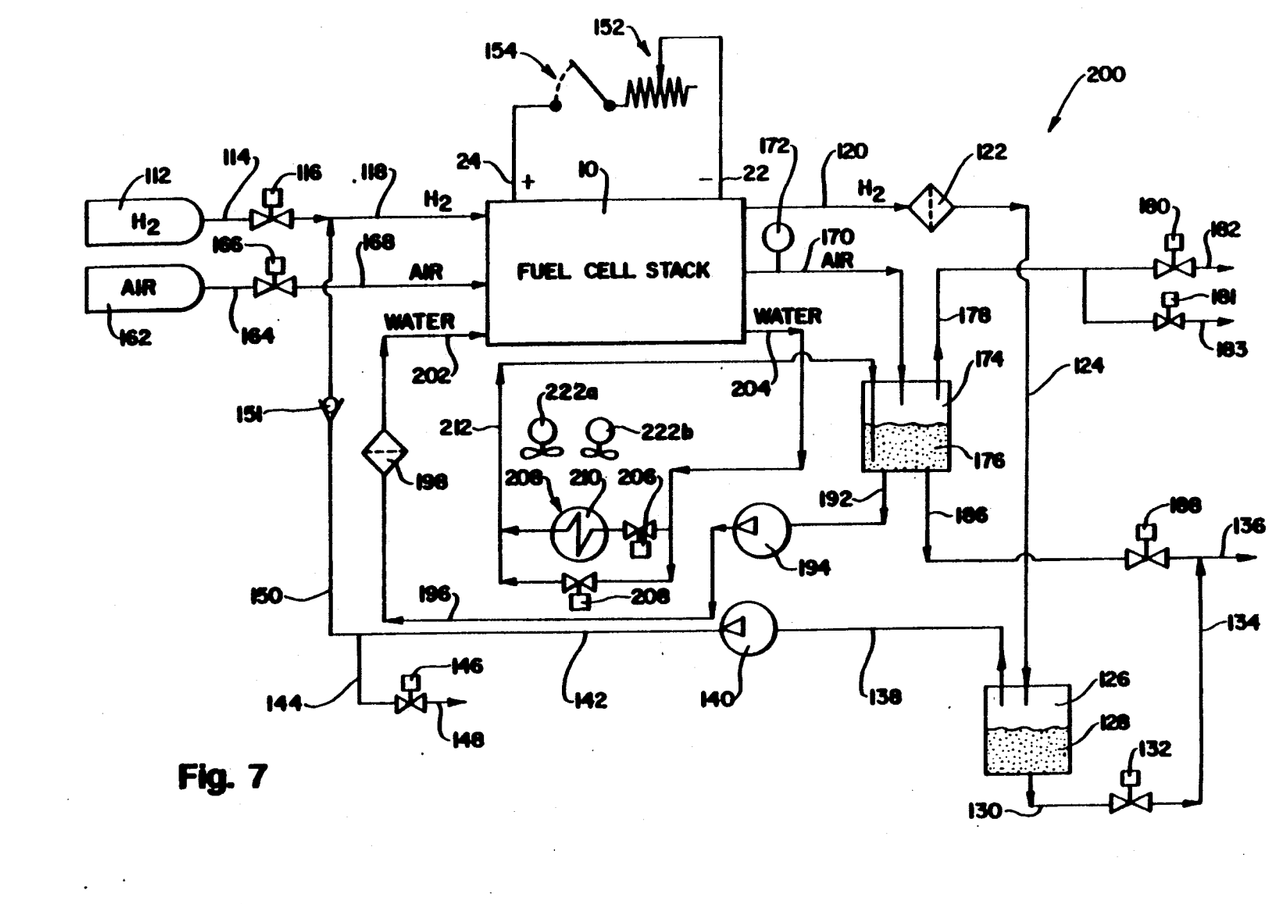
FIG. 7 is a schematic diagram of an integrated fuel cell based electric power generation system.

FIG. 7 is a schematic diagram of an integrated fuel cell based electric power generation system 200 incorporating fuel cell stack 10. Fuel cell stack 10 includes negative and positive bus plates 22 and 24, respectively, to which a circuit comprising variable load 152 and contactor switch 154 is electrically connected. In addition to fuel cell stack 10, the integrated system includes a fuel (hydrogen) circuit, an oxidant (oxygen containing air) circuit and a coolant (water) circuit.

The fuel circuit of system 200 illustrated in FIG. 7 includes a pressurized substantially pure hydrogen supply 112 having fuel feed line 114 associated therewith. On-off valve 116 actuates the flow of fuel from supply 112. Fuel inlet stream 118 enters fuel cell stack 10, where the fuel stream is humidified in the humidification section of stack 10, as described above, and participates in the electrocatalytic oxidation of the fuel in the active section of stack 10. Humidified fuel outlet stream 120 exits fuel cell stack 10 and passes through a deionizing filter 122. Humidified fuel outlet stream 124 exiting filter 122 is fed to a water separator 126, in which a portion of the water from stream 124 is removed, typically by condensation, and the removed water is accumulated in reservoir 128. The removed water is periodically drained from reservoir 128 through water drain lines 130, 134 and 136 by the actuation of valve 132. Valve 132 is actuated when the level of removed water in reservoir 128 exceeds a predetermined value. Valve 132 is typically an integral component of reservoir 128.

As shown in FIG. 7, the dehumidified fuel stream 138 exiting water separator 126 is recirculated by pump 140 through return lines 142 and 150 to fuel inlet stream 118. Return line 150 preferably includes a check valve 151. At periodic intervals, the dehumidified fuel stream in line 142 is purged to expel contaminants accumulated within the stream. Such purging is accomplished by the actuation of purge valve 146, which vents the dehumidified fuel stream to the atmosphere through lines 144 and 148. The dehumidified fuel stream in line 142 is also purged during start up to (1) expel excess water from the fuel flow channels of stack 10, and (2) unload pump 140 to facilitate its actuation.

The oxidant circuit of system 200 includes a pressurized air supply 162 having oxidant feed line 164 associated therewith. In the illustrated embodiment of FIG. 7, air supply 162 consists of approximately 20 percent oxygen, and would therefore be considered a dilute reactant supply. On-off valve 166 actuates the flow of oxidant from supply 162. Oxidant inlet stream 168 enters fuel cell stack 10, where the oxidant stream is humidified in the humidification section of stack 10, as described above, and then participates in the electrocatalytic oxidation of the fuel in the active section of stack 10. Oxidant outlet stream 170 exiting fuel cell stack 10 contains, in addition to the unreacted gases, water from humidification and entrained product water. A thermocouple 172 measures the temperature of oxidant outlet stream 170 just downstream from the exit from fuel cell stack 10, and actuates an air circulation system associated with the coolant heat exchanger, as described below.

The humidified oxidant stream 170 exiting fuel cell stack 10 is directed to water separator 174, as shown in FIG. 7. Water separator 174 removes the absorbed and entrained water from stream 170, both by centrifugal force (i.e., directing stream 170 in an arcuate path against the inside wall of separator 174) and by condensation. The removed water is accumulated in reservoir 176. Reservoir 176 is preferably integral with separator 174, and the relatively cool water contained within reservoir 176 promotes the condensation of water from stream 170. The removed water is periodically drained from reservoir 176 through water drain lines 186 and 136 by the actuation of control valve 188. Control valve 188 is actuated when the water level in reservoir 176 exceeds a predetermined value.

Since the oxidant in the illustrated embodiment is a dilute reactant, it is not recirculated. Instead, the dehumidified oxidant stream 178 is vented to the atmosphere through valve 180 and muffler line 182. During start up (or if otherwise actuated) a second valve 181 is opened to increase the oxidant flow rate through system 200. The opening of valve 181 purges the oxidant flow channels in stack 10 of excess water which may have accumulated (for example, by condensation) during shutdown. The opening of valve 181 causes the oxidant flow to bypass valve 180, and the oxidant stream 178 is vented to the atmosphere through muffler line 183.

It will be understood that in embodiments employing substantially pure oxygen as the oxidant, dehumidified oxidant stream 178 is recirculated in a manner similar to the recirculation of dehumidified fuel stream 138 described above.

The coolant circuit of system 200 derives its coolant fluid from the water removed from humidified oxidant stream 170 and accumulated in reservoir 176. As shown in FIG. 7, coolant water stream 192 exits reservoir 176 and is pumped through water circulation pump 194 to a deionization filter 198 through line 196. The deionized coolant water stream 202 is fed to fuel cell stack, where it is directed through coolant channels (not shown) to absorb heat generated within stack 10. Coolant water stream 204 exits stack 10 and is directed to a heat exchanger assembly 208, which includes heat exchanger 210, valves 206 and 208, and air circulation means 222a and 222b. Air circulation means 222a and 222b are preferably fans. During steady state operation, valve 208 is closed and valve 206 is opened to direct coolant water stream 204 through heat exchanger 210, where coolant water stream 204 transfers heat to another coolant fluid, preferably air, to produce a chilled coolant water stream 212. During start up, valve 206 is closed and valve 208 is opened to bypass heat exchanger 210 and divert coolant water stream 204 to chilled water stream 212 substantially without removing heat from stream 204. As shown in FIG. 7, chilled water stream 212 terminates at reservoir 176.

Air circulation fans 222a and 222b are actuated when the temperature of the humidified oxidant stream exiting stack 10, as measured by thermocouple 172, exceeds a predetermined value. Alternate temperature control schemes are also possible; for example, fans 222a and 222b could be actuated sequentially, with fan 222a actuated when the temperature measured by thermocouple 172 exceeds a first predetermined value and fan 222b actuated when the temperature measured by thermocouple 172 exceeds a second predetermined value.

Figure 8:
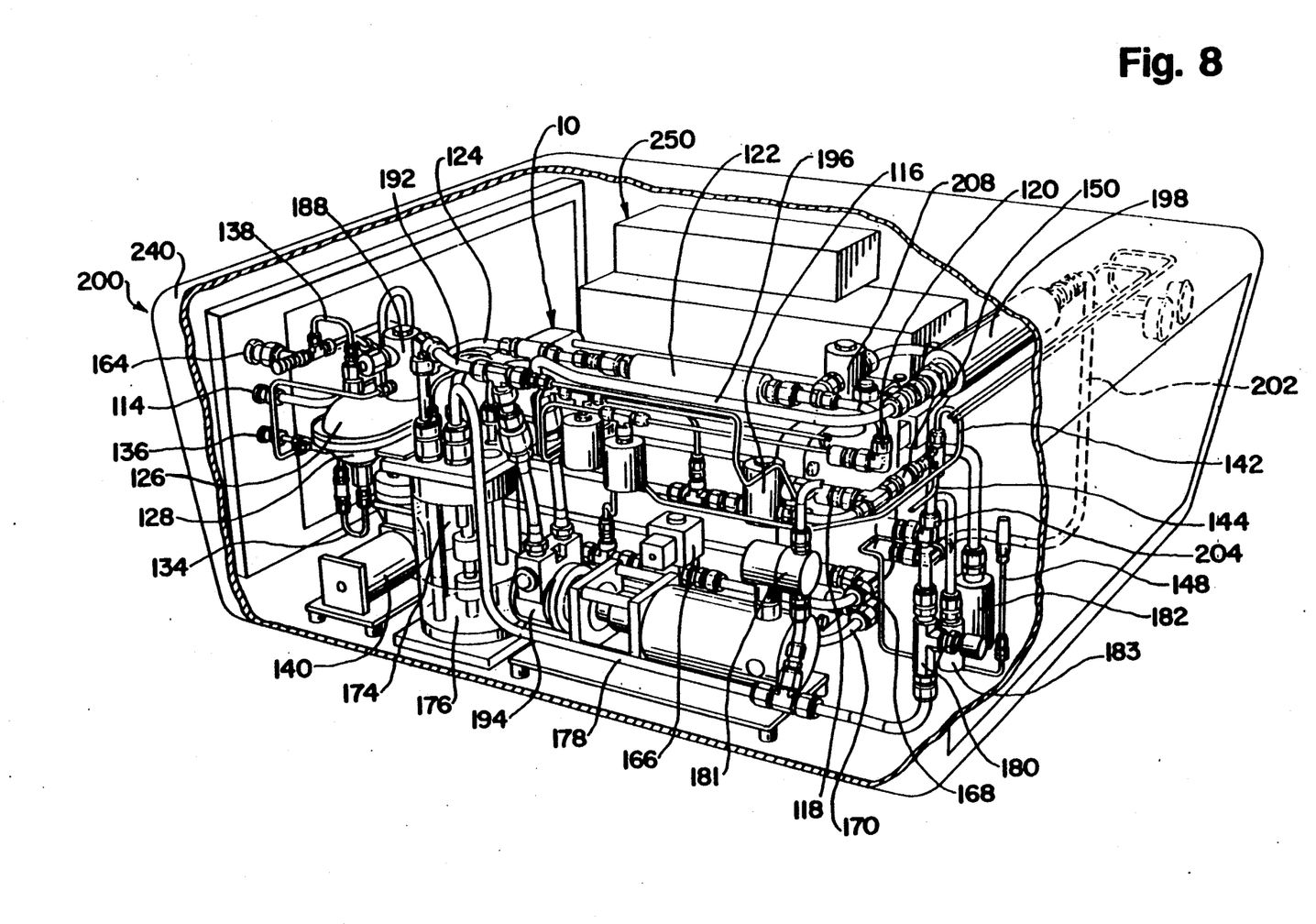
FIG. 8 is a perspective view of an integrated fuel cell based electric power generation system.
Figure 9:
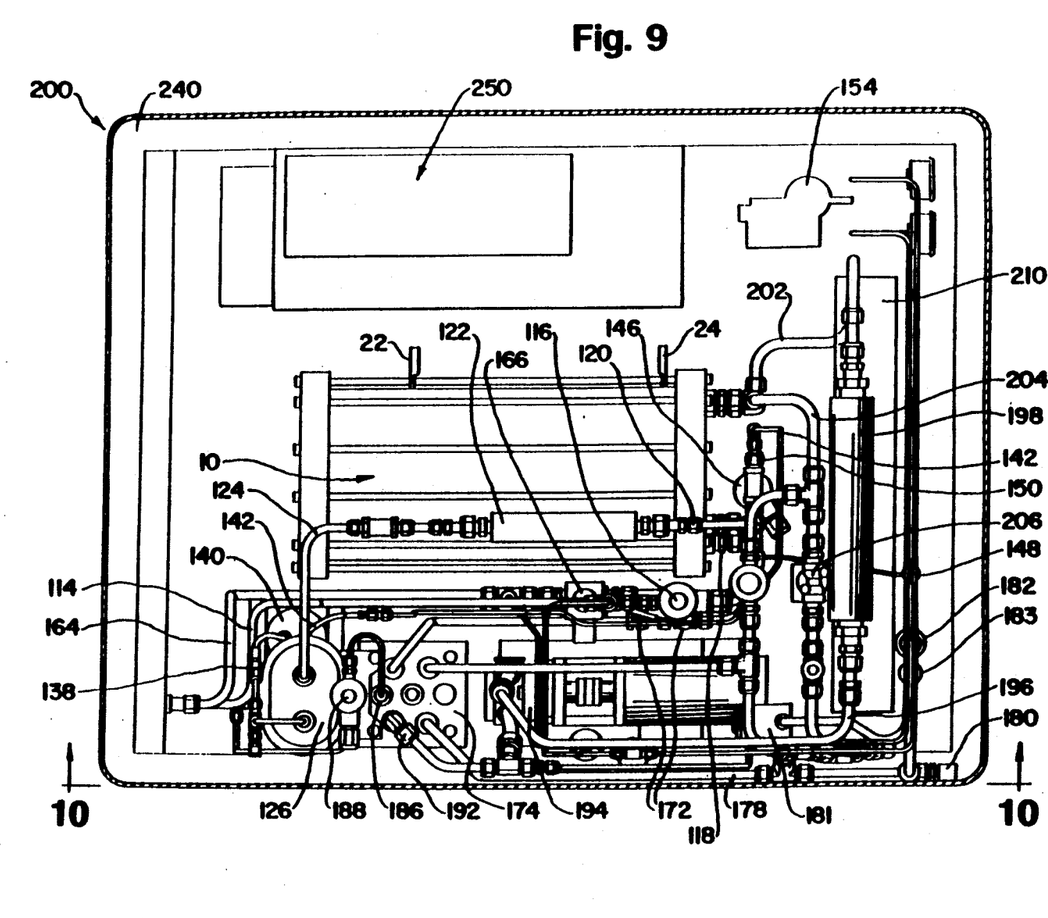
FIG. 9 is a top plan view of the integrated fuel cell based power generation system of FIG. 8.
Figure 10:
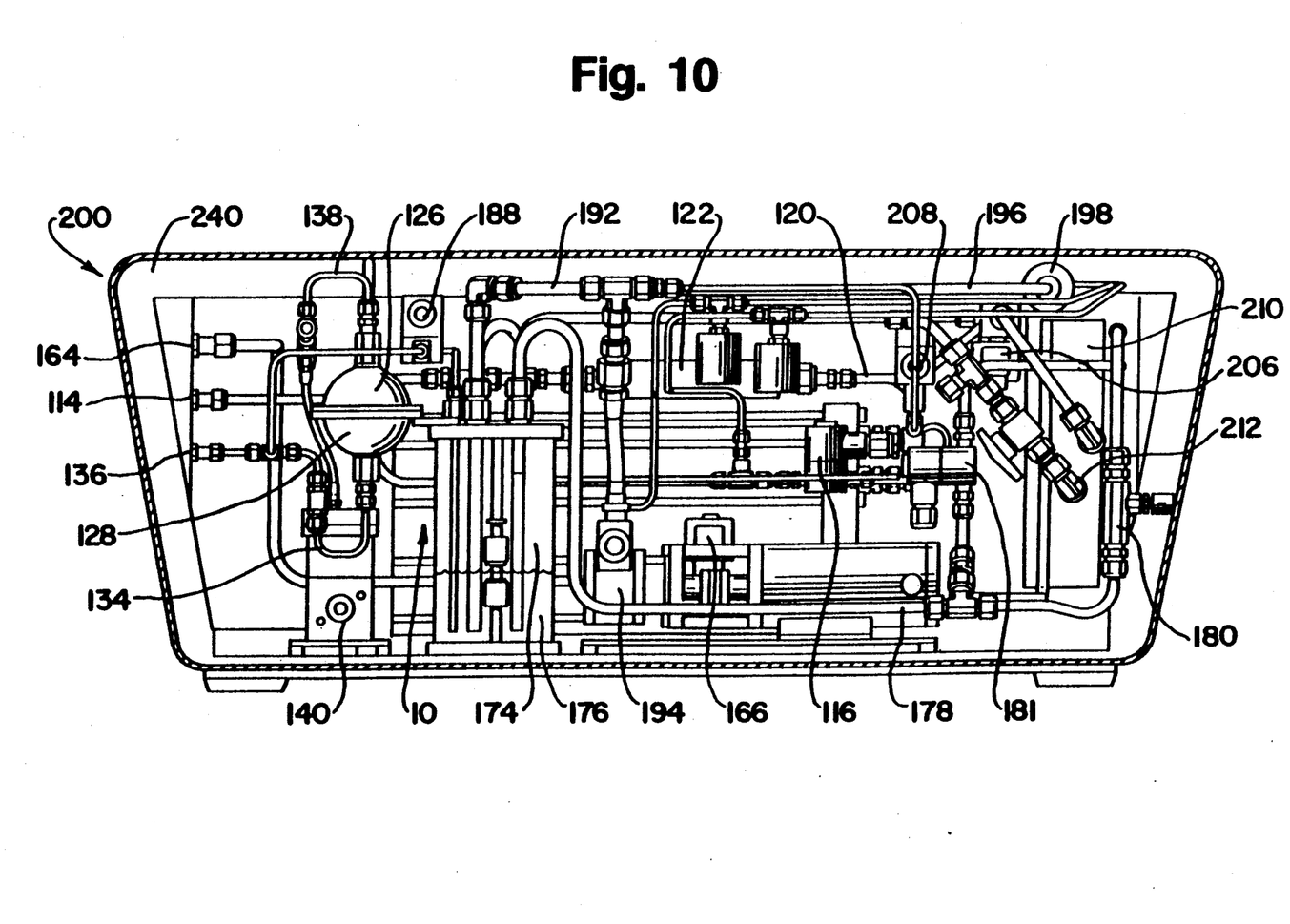
FIG. 10 is a side view of the integrated fuel cell based power generation system taken in the direction of arrows 10—10 of FIG. 9.

FIG. 8, 9 and 10 show perspective, top plan, and side views, respectively, of an integrated fuel cell based power generation system 200 employing fuel cell stack 10. System 200 includes a trapezoidal housing 240 encasing the system components. The interior of housing 240 provides space for the positioning of the electrical control components of system 200, illustrated generally as electrical control components 250 in FIGS. 8 and 9.

The fuel circuit of system 200 includes fuel feed line 114 to which a pressurized substantially pure hydrogen supply (not shown in FIGS. 8-10) is connected. The fuel circuit further includes fuel inlet stream 118, which enters fuel cell stack 10 after merging with recirculated hydrogen return line 150. The humidified fuel outlet stream 120 exiting fuel cell stack 10 passes through deionizing filter 122, and enters water separator 126 as stream 124. In water separator 126, a portion of the water from stream 124 is removed by condensation, and the removed water is accumulated in reservoir 128 positioned directly beneath water separator 126. The removed water drains from reservoir 128 through water outlet line 134, and is expelled from system 200 through water drain line 136.

As shown in FIGS. 8-10, the dehumidified fuel stream 138 exiting separator 126 is recirculated through return lines 142 and 150 to fuel inlet stream 118. As described above in connection with FIG. 7, the dehumidified fuel stream in line 142 is purged at periodic intervals by the actuation of purge valve 146 to vent the dehumidified fuel stream, including any contaminants accumulated therein, to the atmosphere through lines 144 and 148 (see FIG. 8).

The oxidant circuit of system 200 is also illustrated in FIGS. 8-10. The oxidant circuit includes an oxidant feed line 164 to which a pressurized air supply (not shown in FIGS. 8-10) is connected. Valve 166 (shown most clearly in FIG. 9) actuates the flow of oxidant from the external pressurized air supply. Oxidant inlet stream 168 (see FIG. 8) enters fuel cell stack 10, where the oxidant stream is humidified in the humidification section of fuel cell stack 10 and then participates in the electrocatalytic oxidation of the fuel in the active section of stack 10. Oxidant outlet stream 170 exits fuel cell stack 10 containing water from humidification and entrained product water from the reaction of fuel and oxidant, as well as containing unreacted fuel and oxidant gases. Thermocouple 172 (see FIG. 9), measures the temperature of oxidant outlet stream 170 just downstream from the exit of stream 170 from stack 10. The humidified oxidant stream 170 is then directed to a water separator (see FIGS. 8 and 10), which removes absorbed and entrained water from stream 170, as previously described in connection with FIG. 7. The removed water is accumulated in reservoir 176, which is shown in FIGS. 8-10 as being integral with separator 174. Accumulated water is periodically removed from reservoir 176 through water drain line 136 by actuation of valve 188 when the water level in reservoir 176 exceeds a predetermined value. The dehumidified oxidant stream 178 exiting water separator 178 is vented to the atmosphere through valve 180 and muffler line 182. As shown in FIGS. 8-10, a second valve 181 causes the oxidant stream 178 to bypass valve 180, and vents stream 178 to the atmosphere through muffler line 183.

The coolant circuit components of system 200 are also shown in FIGS. 8-10. As previously indicated, the coolant circuit derives its coolant fluid from the water removed from the humidified oxidant stream 170 exiting stack 10 (see FIG. 8) and accumulated in reservoir 176. As illustrated particularly in FIG. 8, coolant water stream 192 exits reservoir 176 and is pumped through water circulation pump 194 to a deionizing filter 198 through line 196. The deionized coolant water stream 202 is then directed into the coolant channels (not shown) of fuel cell stack 10 to absorb heat generated within stack 10. Coolant water stream 204 exiting stack 10 is directed to heat exchanger 210 (see FIG. 9). During start up, valve 206 is closed and valve 208 is opened to bypass heat exchanger 210 and divert coolant water stream 204 directly to chilled water stream 212, substantially without removing heat from stream 204. During steady state operation, valve 208 is closed and valve 206 is opened to direct coolant water stream 204 through heat exchanger 210, where coolant water stream 204 transfers heat to another coolant fluid, namely air directed across the heat transfer surfaces of heat exchanger 210 by air circulation fans (not shown in FIGS. 8–10). The chilled water stream 212 exiting heat exchanger 210 (see FIG. 10) terminates at reservoir 176.

In summary, the present fuel cell based power generation system integrates the electrochemically active section with the humidification section in the same fuel cell stack. The system employs the coolant water stream from the active section of the fuel cell stack as the humidification water stream to more effectively humidify the fuel and oxidant at the operating temperature and pressure of the stack. In addition, the product water stream generated electrochemically in the fuel cell stack is employed as the coolant stream to regulate the temperature of the stack. Thus, the present integrated system avoids the need to provide a separate external source of coolant fluid. Moreover, during start up, the present system's use of the warm product water stream as the coolant stream allows the active section to be rapidly brought to operating temperature.

While particular elements and applications of the present invention have been shown and described, it will be understood, of course, that the invention is not limited thereto since modifications may be made by those skilled in the art, particularly in light of the foregoing teachings. It is therefore contemplated by the appended claims to cover such modifications and incorporate those features which come within the scope and spirit of the invention.

What is claimed is:

1. An electrical power generation system comprising:
   a fuel cell stack comprising a humidification section and an electrochemically active section, said humidification section comprising at least one fuel humidification assembly comprising a fuel humidification water stream, an inlet hydrogen containing fuel stream and a water vapor transport membrane interposed therebetween for transporting water vapor from said fuel humidification water stream to said inlet fuel stream to produce a humidified fuel stream, said humidification section further comprising at least one oxidant humidification assembly comprising an oxidant humidification water stream, an inlet oxygen containing oxidant stream and a water vapor transport membrane interposed therebetween for transporting water vapor from said oxidant humidification water stream to said inlet oxidant stream to produce a humidified oxidant stream, said electrochemically active section comprising at least one fuel cell comprising:
      an anode having a catalyst associated therewith for producing cations from said humidified fuel stream,
      a cathode having a catalyst associated therewith for producing anions from said humidified oxidant stream, said anions reacting with said cations to form water at said cathode,
      an ion exchange membrane interposed between said anode and said cathode, said membrane facilitating the migration of cations from said anode to said cathode and isolating said humidified fuel stream from said humidified oxidant stream, and
      an electrical path for conducting the electrons formed at said anode to said cathode,
   said electrochemically active section further comprising at least one inlet coolant water stream for absorbing heat generated within said electrochemically active section to produce an outlet coolant water stream;
   a heat exchanger for removing heat from said outlet coolant water stream to produce a chilled coolant water stream;
   a water separator for removing water from said humidified oxidant stream to produce a dehumidified oxidant stream and a removed water stream;
   a coolant reservoir for receiving said removed water stream from said water separator and for receiving said chilled coolant water stream from said heat exchanger;
   wherein said inlet coolant water stream is drawn from said coolant reservoir.

2. The electrical power generation system of claim 1 further comprising a second water separator for removing water from said humidified fuel stream to produce a dehumidified fuel stream, said dehumidified fuel stream recirculated to said inlet fuel stream.

3. The electrical power generation system of claim 2 further comprising a purge valve for venting said dehumidified fuel stream to the atmosphere to expel contaminants accumulated within said dehumidified fuel stream.

4. The electrical power generation system of claim 1 wherein said dehumidified oxidant stream is recirculated to said inlet oxidant stream.

5. The electrical power generation system of claim 4 further comprising a purge valve for venting said dehumidified oxidant stream to the atmosphere to expel contaminants accumulated within said dehumidified oxidant stream.

6. The electrical power generation system of claim 1 wherein said outlet coolant water stream feeds said fuel humidification water stream and said oxidant humidification water stream 7. The electrical power generation system of claim 1 wherein said fuel humidification water stream and said oxidant humidification water stream are integrated.

8. The electrical power generation system of claim 1 wherein said water separator and said coolant reservoir are integral, the water contained within said reservoir promoting the condensation of water from said humidified oxidant stream.

9. The electrical power generation system of claim 1 wherein said heat exchanger comprises heat exchange surfaces and air circulation means directed toward said surfaces, and further comprising control means for actuating said air circulation means when the temperature of said humidified oxidant stream exiting said fuel cell stack exceeds a predetermined value.

10. The electrical power generation system of claim 1 wherein said heat exchanger further comprises valve means for diverting said outlet coolant water stream to said chilled coolant water stream substantially without removing heat therefrom, and further comprising control means for actuating said valve means when the temperature of said humidified oxidant stream exiting said fuel cell stack is below a predetermined value.

11. An electrical power generation system comprising:
- a fuel humidifier comprising a fuel humidification water stream, an inlet hydrogen containing fuel stream, and means for transporting water vapor from said fuel humidification water stream to said inlet fuel stream to produce a humidified fuel stream;
- an oxidant humidifier comprising an oxidant humidification water stream, an inlet oxygen containing oxidant stream, and means for transporting water vapor from said oxidant humidification water stream to said inlet oxidant stream to produce a humidified oxidant stream;
- a fuel cell stack comprising at least one fuel cell, said at least one fuel cell comprising:
  - an anode having a catalyst associated therewith for producing cations from said humidified fuel stream,
  - a cathode having a catalyst associated therewith for producing anions from said humidified oxidant stream, said anions reacting with said cations to form water at said cathode,
  - an ion exchange membrane interposed between said anode and said cathode, said membrane facilitating the migration of cations from said anode to said cathode and isolating said humidified fuel stream from said humidified oxidant stream, and
  - an electrical path for conducting the electrons formed at said anode to said cathode,
- said fuel cell stack further comprising at least one inlet coolant water stream for absorbing heat generated within said fuel cell stack to produce an outlet coolant water stream;
- a heat exchanger for removing heat from said outlet coolant water stream to produce a chilled coolant water stream;
- a water separator for removing water from said humidified oxidant stream to produce a dehumidified oxidant stream and a removed water stream;
- a coolant reservoir for receiving said removed water stream from said water separator and said chilled coolant water stream from said heat exchanger;
- wherein said inlet coolant water stream is drawn from said coolant reservoir.

12. The electrical power generation system of claim 11 further comprising a second water separator for removing water from said humidified fuel stream to produce a dehumidified fuel stream, said dehumidified fuel stream recirculated to said inlet fuel stream.

13. The electrical power generation system of claim 12 further comprising a purge valve for venting said dehumidified fuel stream to the atmosphere to expel contaminants accumulated within said dehumidified fuel stream.

14. The electrical power generation system of claim 11 wherein said dehumidified oxidant stream is recirculated to said inlet oxidant stream.

15. The electrical power generation system of claim 14 further comprising a purge valve for venting said dehumidified oxidant stream to the atmosphere to expel contaminants accumulated within said dehumidified oxidant stream.

16. The electrical power generation system of claim 11 wherein said outlet coolant water stream feeds said fuel humidification water stream and said oxidant humidification water stream.

17. The electrical power generation system of claim 11 wherein said fuel humidification water stream and said oxidant humidification water stream are integrated.

18. The electrical power generation system of claim 11 wherein said water separator and said coolant reservoir are integral, the water contained within said reservoir promoting the condensation of water from said humidified oxidant stream.

19. The electrical power generation system of claim 11 wherein said heat exchanger comprises heat exchange surfaces and air circulation means directed toward said surfaces, and further comprising control means for actuating said air circulation means when the temperature of said humidified oxidant stream exiting said fuel cell stack exceeds a predetermined value.

20. The electrical power generation system of claim 11 wherein said heat exchanger further comprises valve means for diverting said outlet coolant water stream to said chilled coolant water stream substantially without removing heat therefrom, and further comprising control means for actuating said valve means when the temperature of said humidified oxidant stream exiting said fuel cell stack is below a predetermined value.

* * * * *

UNITED STATES PATENT AND TRADEMARK OFFICE
CERTIFICATE OF CORRECTION

PATENT NO. : 5,200,278
DATED : Apr. 6, 1993
INVENTOR(S) : David S. Watkins, et al It is certified that error appears in the above-indentified patent and that said Letters Patent is hereby corrected as shown below:

```
Column 5, line 65, change "a" to --the--.
Column 6, line 54, delete "figured" insert --in Fig. 3, each
assembly 12 consists of two oppositely configured--.
Column 10, line 43, after the word "separator" insert --174--.
```

Signed and Sealed this

Twelfth Day of April, 1994

Attest:

BRUCE LEHMAN

*Commissioner of Patents and Trademarks*

*Attesting Officer*